July 14, 1942.  L. B. GREEN  2,289,355
PHONOGRAPH RECORD CHANGING MECHANISM
Filed Jan. 8, 1940  4 Sheets-Sheet 1
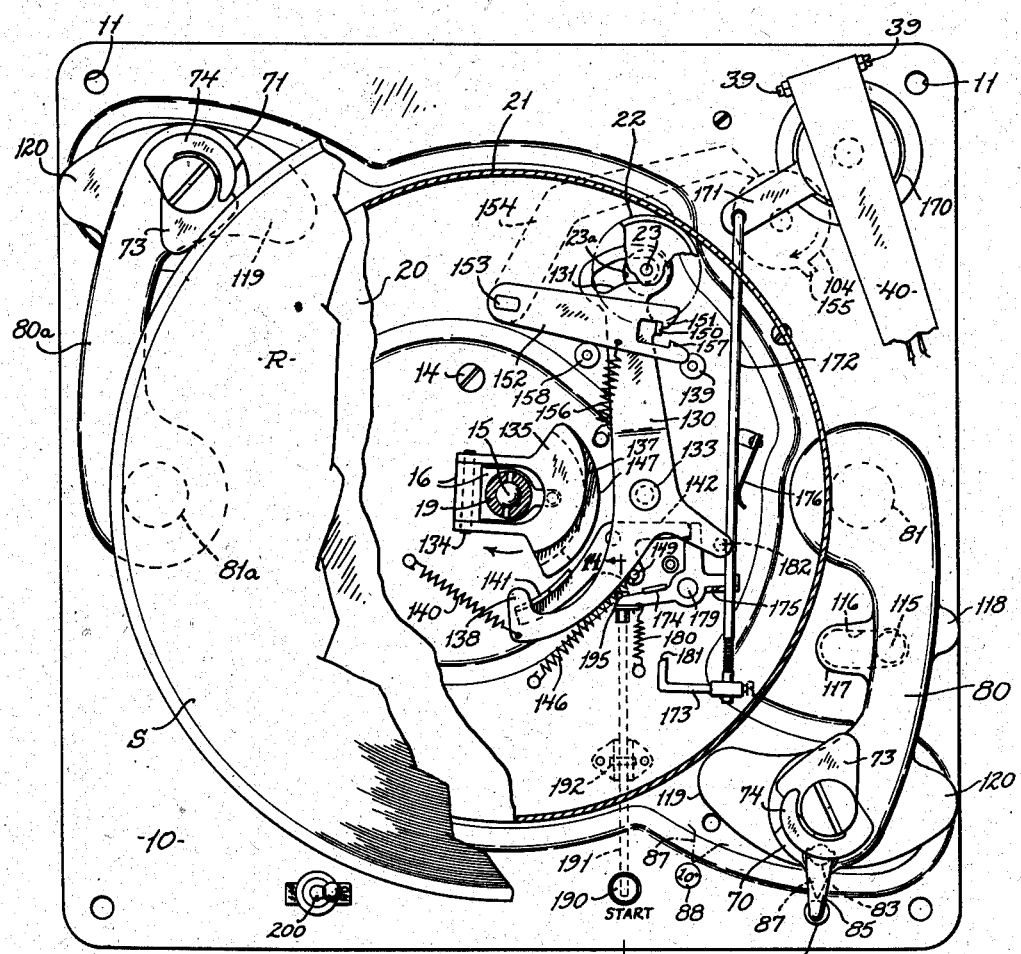
Fig. 1
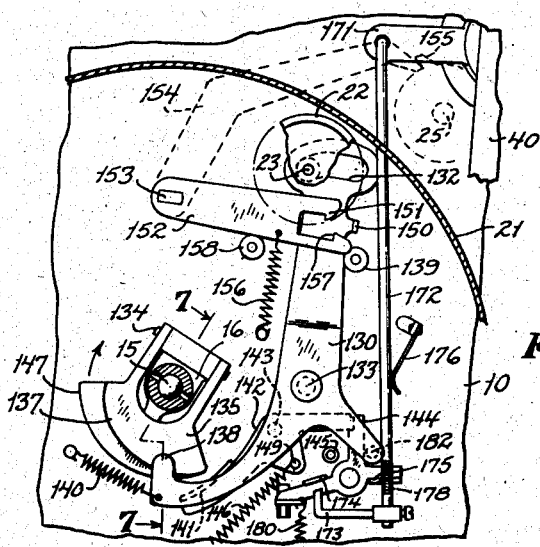
Fig. 2
Fig. 3
Lee B. Green, INVENTOR.
BY Frank T. T. Slough
ATTORNEY.

July 14, 1942.   L. B. GREEN   2,289,355

PHONOGRAPH RECORD CHANGING MECHANISM

Filed Jan. 8, 1940   4 Sheets-Sheet 2

Lee B. Green, INVENTOR

BY Frank M. Slough

ATTORNEY.

July 14, 1942.  L. B. GREEN  2,289,355
PHONOGRAPH RECORD CHANGING MECHANISM
Filed Jan. 8, 1940  4 Sheets-Sheet 3

Lee B. Green, INVENTOR.
BY Frank M. Slough.
ATTORNEY.

July 14, 1942.    L. B. GREEN    2,289,355
PHONOGRAPH RECORD CHANGING MECHANISM
Filed Jan. 8, 1940     4 Sheets-Sheet 4

INVENTOR.
Lee B. Green
BY
Frank M. Slough
ATTORNEY.

Patented July 14, 1942

2,289,355

UNITED STATES PATENT OFFICE 2,289,355

PHONOGRAPH RECORD CHANGING MECHANISM

Lee B. Green, Lakewood, Ohio, assignor to The General Industries Company, Elyria, Ohio, a corporation of Ohio Application January 8, 1940, Serial No. 312,839

9 Claims. (Cl. 274—10)

My invention relates to record changing mechanisms for phonographs, and relates more particularly to record changing mechanisms of the general type wherein a stack of records, normally supported above a phonograph turntable, are automatically lowered, one at a time, onto the uppermost surface of the turntable, or onto the uppermost surface of any uppermost records at the time disposed on the turntable, for reproduction by the phonograph reproducer adapted to traverse and reproduce the records during the playing thereof.

It is an object of my invention to provide an improved mechanism of the above type which may be economically manufactured, and which is of sturdy and reliable construction, and which will operate over long periods for a great number of operations, without the necessity of readjustment of any of the parts.

Another object of my invention is to provide an improved mechanism of the above type, wherein improved record supporting and lowering means is provided to more reliably lower one of the records of a stack of records supported thereby, and without the liability of damage to records of the supported stack even though these may vary slightly in diameters and in edge portion thicknesses, and the form of the edges.

Another object of my invention is to provide improved supporting and record discharging means, as set forth in the previous object, wherein a plurality of said supporting means may cooperatively support a stack of records and lower one of said records at a time, as desired, in sequence.

Another object of my invention is to provide a mechanism achieving the aforesaid object, and wherein said plurality of means may be readily and quickly adjusted by an operator to accommodate records of different standard sizes.

Another object of my invention is to provide an improved phonograph mechanism of the general type above referred to, and whereby the required movements of the tone arm at the conclusion of the playing of one record and prior to the playing of the next record, and the required movements of the record supporting and discharging means, may be expeditiously effected.

Another object of my invention is to provide a mechanism achieving the preceding object, and wherein the operation of the said parts may be effected at the proper times by power transmitted through a power take-off of the phonograph mechanism, deriving its motion by a friction drive means engaging the phonograph turntable.

Another object of my invention is to provide an improved mechanism of the type and operating according to the preceding object, wherein the said power take-off motion communicating means may be rendered inoperative during periods which comprise the record playing periods.

Another object of my invention is to provide an improved mechanism, achieving the preceding object, wherein disabling of said power take-off means is achieved preliminary to the playing of a record by movement of the phonograph reproducer tone arm.

Other objects of my invention and the invention itself will become apparent to those skilled in the art by reference to the accompanying drawings and the following description of the embodiment of my invention illustrated therein.

Fig. 1 is a top plan view of the phonograph and record changer unit of my invention, certain parts being broken away, showing the condition when the power take-off has swung the tone arm aside;

Fig. 2 is a fragmentary plan view showing certain of the parts of Fig. 1 while a record is being played;

Fig. 3 is an enlarged detail of a portion of Fig. 2;

Figure 4:
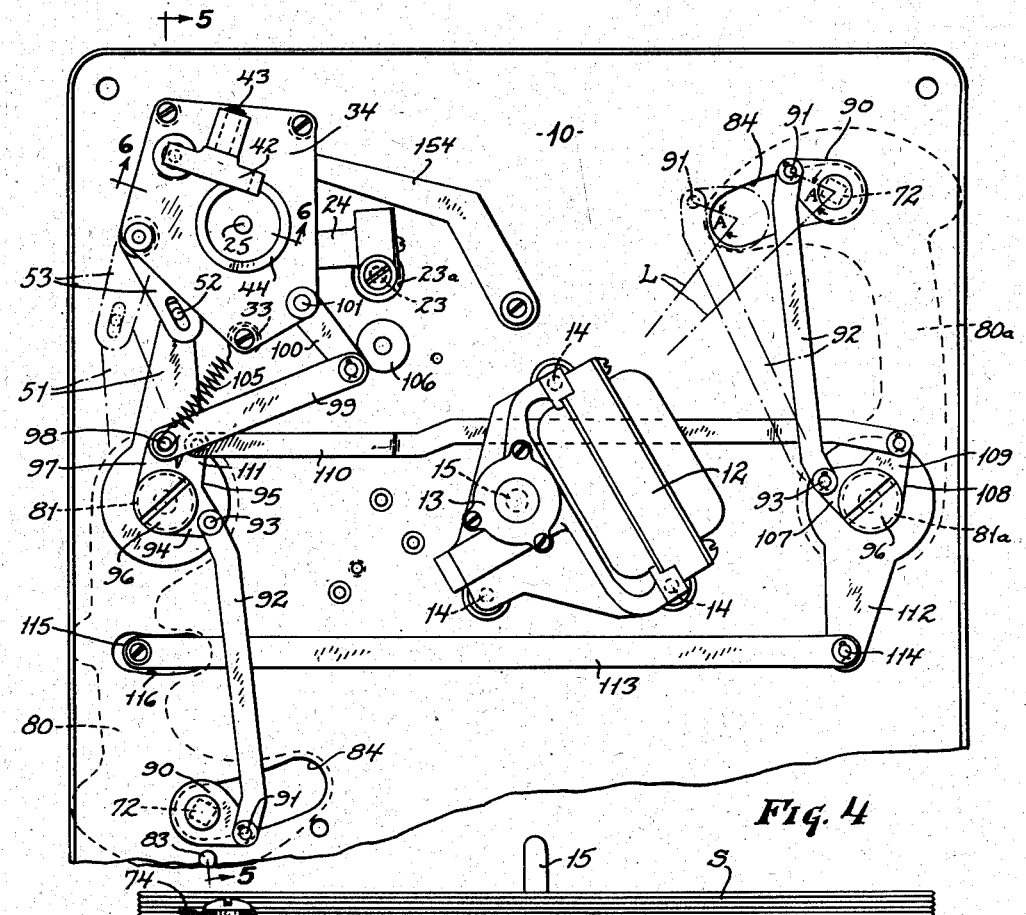
Fig. 4 is a bottom plan view of the entire unit.

In the drawings the numeral 10 indicates a base plate upon which are mounted the turntable, tone arm, and record changing mechanisms of my invention, the entire unit being adapted for mounting in a suitable cabinet by means of the bolt holes 11.

Figure 7:
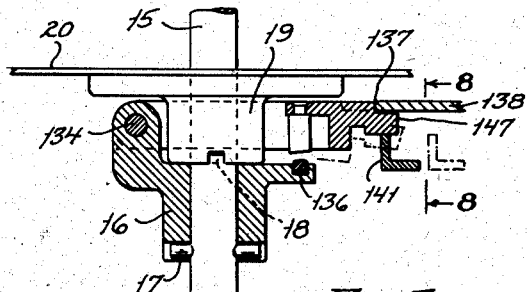
Fig. 7 is a fragmentary section taken on the line 7—7 of Fig. 2; with the parts in a slightly different relationship.

A synchronous motor 12, Fig. 4, with its associated speed reduction unit 13, is mounted below the base plate by means of the bolts 14, the unit 13 carrying the elongated record spindle 15. Drivingly mounted on this spindle, as seen in Fig. 7, is a block 16, hereinafter more fully described, the lower face of which is slotted to embrace and rest upon the pin 17. Formed on the upper face of the block are two lugs 18 which engage a slot in the hub 19 of the turntable 20. The turntable is thus drivingly carried by the spindle 15 but may be readily lifted off for access to the mechanism concealed beneath it.

Figure 5:
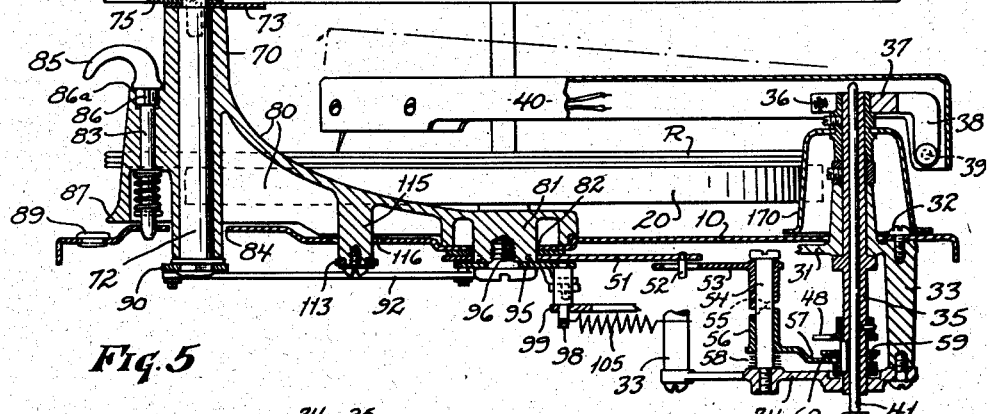
Fig. 5 is a vertical section taken on the line 5—5 of Fig. 4.

A power take-off at the rim 21 of the turntable drives the mechanisms which lift the tone arm, at the conclusion of a record, swing it off to the side, and return it to the succeeding record, and which drop the succeeding record into place from the stack of S of Fig. 5. As illustrated in Fig. 1, a rubber-tired wheel 22 is adapted to engage the inner surface of the turntable rim and to be rotated by it when so engaged. This wheel 22 is mounted on a spindle 23 which projects through an enlarged opening 23a in the base plate 10 and is carried by a speed reducer housing 24, Figs. 4 and 9. The housing 24 may be oscillated about a shaft 25, and thus the wheel 22 may be swung into and out of engagement with the rim 21, under control of the mechanism concealed beneath the turntable and to be later described.

Figure 9:
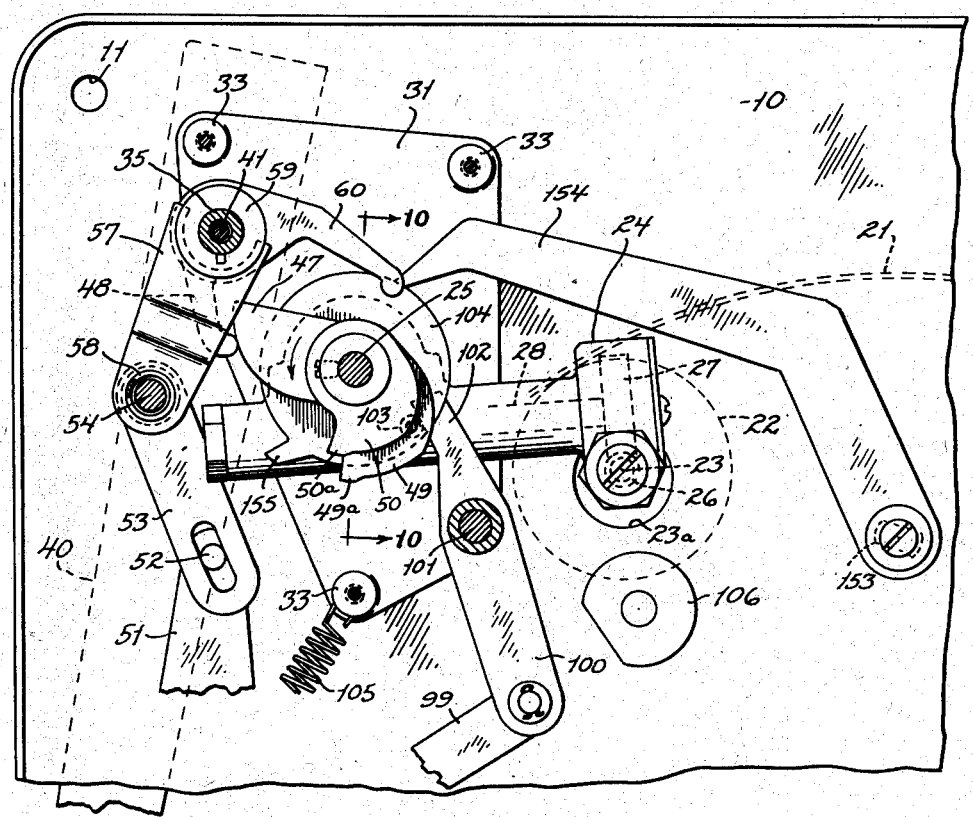
Fig. 9 is a view similar to a part of Fig. 4, but with the bottom frame plate removed for greater clarity.
Figure 10:
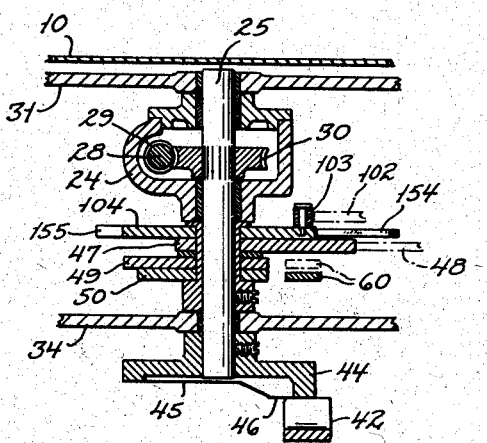
Fig. 10 is a section taken on the line 10—10 of Fig. 9, but with certain of the parts rotated into the plane of the section which would not otherwise appear.

Within the housing 24, Fig. 9, the spindle 23 carries a worm 26 driving a worm wheel 27 on a shaft 28. Near its opposite end, illustrated in Fig. 10, the shaft is formed as a worm 29 driving a worm wheel 30 rigid with the shaft 25, before mentioned, which carries the various cams controlling the tone arm and record changes. The upper end of the shaft 25 is rotatably mounted in a plate 31 bolted, as at 32, Fig. 5, beneath the base plate 10. Depending, integral legs 33 of the plate 31 support a lower plate 34 which carries the bearing for the lower end of the shaft 25.

Figure 6:
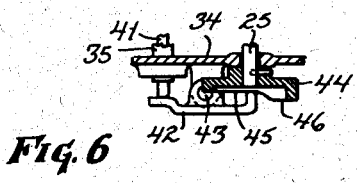
Fig. 6 is a vertical section taken on the line 6—6 of Fig. 4.

Also journalled in the upper and lower plates is a hollow shaft 35, Fig. 5, which projects upwardly through the base plate 10. Clamped to the upper end of the shaft, by means of a bolt 36, is a block 37 having depending ears 38. These ears support the pivot pins 39 of the tone arm 40. The tone arm normally rests on the record, but may be swung upwardly by the upper end of the rod 41, slidable within the hollow shaft 35. The lower end of the rod is engaged by a rocker arm 42 pivoted at 43, Figs. 4 and 6, to the lower plate 34. The rocker arm, in turn, engages a cam wheel 44 drivingly secured to the shaft 25. During normal playing operation of the phonograph, the rocker arm engages a lull 45 of the cam and allows the rod 41 to drop free of the tone arm so that the weight of the latter is carried by the needle on the record in the usual manner. At the conclusion of the record, however, the power take-off is initiated and the cam is revolved, rocking the arm 42 to lift the rod 41, and thereby lifting the tone arm from the record. The tone arm remains elevated due to the lull 46 of the cam, until the operations of swinging it aside and back again, and of record changing, have been completed.

The swinging of the tone arm in an outward direction is accomplished by means of a cam 47 rigid with the shaft 25. Pinned to the tone arm shaft 35, Figs. 5 and 9, is a cam follower 48 which is engaged by the cam 47, immediately after the tone arm has been raised. The cam is so formed as to swing the follower 48, and therefore the tone arm, until the latter is free of the largest record for which the phonograph is adapted, in the present case one of twelve-inch diameter, and by continued rotation to free the follower for subsequent return by other means.

The return of the tone arm to the succeeding record is controlled by either of two cams 49 or 50, depending upon the size of the records being played. The machine of the present invention is adapted to accommodate the two common standard sizes, namely the ten-inch and twelve-inch records, by adjusting the position of the stack supporting posts, as later described. It will suffice at this time merely to say that the position of the post adjacent to the tone arm mechanism rotates an arm 51, Fig. 4, into either of two positions. A pin 52 in this arm is embraced by a slot in an arm 53, the integral hub of which may rotate on a stud 54 fixed to the lower plate 34. The lower face of the hub is formed as a cam 55 which co-acts with a complementary cam on the hub 56 of a fork 57. The fork is slidable on the stud 54 and is urged upwardly, by a spring 58, against the cam 55, the upward movement of the latter being limited by the head of the stud. Thus when the adjustment is made for a twelve-inch record the arm 51, and therefore the arm 53, are in the full line position of Fig. 4 and the cam 55 forces the fork 57 to its lower position. With conditions set for ten-inch records, the arm 53, will be in the broken line position and the cam will allow the spring to raise the fork to its upper position.

Slidably keyed to the tone arm shaft 35, Figs. 5 and 9, is the hub 59 of a cam follower 60 which may engage either of the cams 49 or 50, rigid with the shaft 25, as determined by the fork 57 which embraces a groove in the hub 59. The follower 60 extends to the opposite side of the shaft 25 from the follower 48, previously described, and hence rotates the shaft 35 and the tone arm to return the latter from its outer position. As seen in Fig. 9, each cam 49 and 50 is so formed as to be free of the follower 60 during most of its revolution but engages, at the proper time, to rotate it to a point where the tone arm is positioned immediately above the starting groove of the twelve-inch record. Further revolution of the cam 50 frees the follower entirely and the tone arm is then lowered to the record, as previously described, and is carried along by the groove in the usual manner during playing. Kick-in humps 50a and 49a give the tone arm an impulse to swing it in the playing direction to insure engagement of the tone arm needle with the playing groove of a record.

Figure 13:
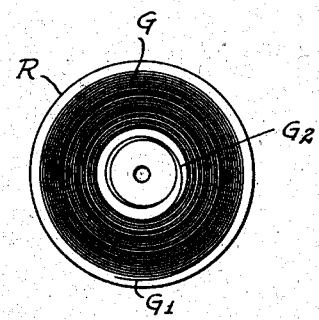
Fig. 13 is a plan view of a record.

When operating with ten-inch records the tone arm, of course, must be returned a greater distance to reach the starting groove G1, Fig. 13, and therefore the cam 49, at which the follower 60 is positioned in this case, is sufficiently larger than the cam 50 to produce the additional rotation of the follower. In other respects the two cams are alike.

Figure 11:
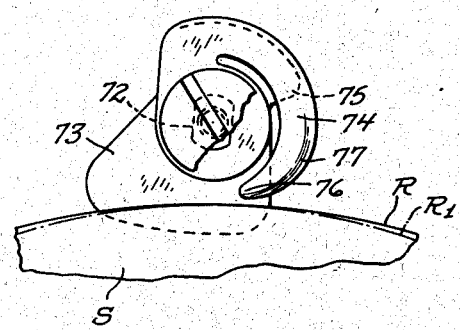
Fig. 11 is an enlarged plan of the record stack supporting unit.
Figure 12:
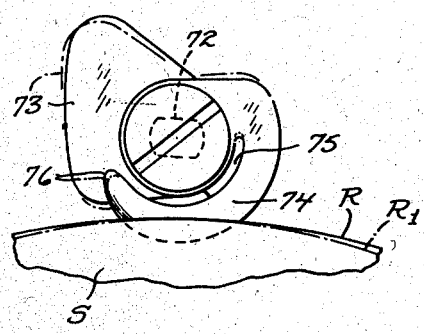
Fig. 12 is a similar view showing the parts of Fig. 11 in a different position.

During the interval in which the tone arm remains at its outermost position, a record R is dropped from a previously arranged stack S, Fig. 5, onto the turntable. Of course one or more records may already be on the turntable at this time but there is more than ample frictional contact between them to drive the uppermost one during the playing operation, and the tone arm 40 is raised sufficiently by the rod 41 to clear an accumulated ten or more. To support the stack of records above the turntable, until such a time as they are to be dropped on the turntable, two posts 70 and 71 are positioned at diametrically opposite corners of the base plate 10, as seen in Fig. 1. Carried within these posts, and rotated by means later described, are shafts 72, Fig. 5. Mounted on the squared upper end of each shaft 72 is a flat, roughly triangular plate 73, the inner edge portion of which is slightly within the periphery of a record, as seen in Figs. 1 and 11, and thus serves as a support therefor. Rotation of the shaft, and therefore of the plate, through approximately a quarter of a revolution in a clockwise direction removes this support and the record is free to drop upon the turntable below. To provide a support for the remainder of the stack while releasing the lowermost record, a second plate 74 is also mounted on the squared end of the shaft 72 and spaced above the first plate, by a third plate 75, a distance equal to the average thickness of a record. The plate 74 is formed for the greater part as a narrow, curved, detached tongue, the outer edge near the free end 76 being beveled, as at 77 in Fig. 11. Flexible because of its form and being further made of relatively flexible material such as spring steel, it can readily penetrate between the lower two records as the shaft 72 is turned, despite variations in record thickness, and without damage to them. By the time the lower plate 73 is about to allow the bottom record to drop, the tongue has turned sufficiently for the stack to be supported at the relatively stiff region near the underlying spacer plate 75. After the record has been dropped, the parts reaching the position shown in Fig. 12, the shaft is rotated in the opposite direction to return the support to its original position. In doing so the stack rides down the flexible tongue and is gently deposited upon the main supporting plate 73 and is ready for the next cycle.

As previously stated, two sizes of records are to be accommodated and the supporting posts 70 and 71 are therefore so formed as to assume the necessary positions. The post 70 will be first described; this post is carried by an integral standard 80, Figs. 1 and 5, having a boss 81 projecting downwardly through a hole 82 in the base plate 10. About this boss as a pivot the post is swung to either of its two operating positions. It is to the boss 81 that the arm 51, previously described, is splined as seen in Fig. 5. A spring-pressed plunger 83 slides vertically in the standard 80 and may enter either of two holes in the base plate. The plunger is retractable by means of the handle 85 and may be retained in retracted position by the radial lugs 86 which are withdrawn from corresponding slots in the standard and ride upon the horizontal face 86a when the handle is turned. A pointer 87 is provided on the standard to register with suitable indicia, such as the inscribed buttons 88 and 89 on the base plate, to facilitate the correct placing of the post by the operator. The post may be swung outwardly past its outermost record-supporting position to allow the larger size records to be removed from the turntable.

The post 70 projects downwardly through an opening 84 and secured to the lower, squared end of the shaft 72, carrying the record supporting unit 73, is a short crank 90 below the base plate, as seen in Figs. 4 and 5. To this crank, at 91, is pivoted a link 92 which at its other end is pivoted, at 93, to one arm 94 of a bell crank 95. The bell crank is freely pivoted on a stud 96 mounted at the center of the boss 81. To a second arm 97 of the bell crank is pivoted, at 98, a link 99 which at its other end is pinned to a rocker arm 100. This rocker arm is rotatably mounted on a post 101 carried by the upper and lower frame plates 31 and 34, previously described, and its free end 102 extends into the path of a roller pin 103 on a disc 104 rigid with the shaft 25. A spring 105, extending between the pivot pin 98 and one of the legs 33 of the frame member 31, normally keeps the rocker arm against the rubber bumper 106, and the plate 73 in stack supporting position. During rotation of the shaft 25, by the power take-off, the pin 103 approaches and engages the side face at one end 102 of the rocker arm and continued rotation rocks it about the post 101 in a clockwise direction as viewed in Figs. 4 and 9. This, through the linkage 90—99, rotates the shaft 72 to drop the record from the plate 73 as previously described. Upon further rotation of the shaft 25, the rocker arm rides off the pin 103 and the linkage 90—99 and the record supporting unit are restored by the spring 105.

The post 71 is provided with an identical stack supporting unit 73, shaft 72, crank 90, pivot 91, and link 92, as is the post 70. The link 92 is pivoted at 93 to an arm 107 of a bell crank 108 rotatably mounted on the stud 96 at the pivot point 81a of the standard 80a, which is diametrically opposite the boss 81 of the standard 80 and at an equal distance from the turntable spindle. The other arm 109 of the bell crank 108 is linked by the bar 110 with a third arm 111 of the bell crank 95. The two arms 109 and 111 are parallel and of equal length, and hence any rotation to the bell crank 95 imparts an equal rotation to the bell crank 108. Moreover, parallelism and equality of length are provided between the arms 94 and 107, the links 92—92, and the cranks 90—90, respectively. Thus the shafts 72 are given equal rotations by the rocker arm 100 and it is assured that the two units 73 will drop their respective portions of the record simultaneously so that it will not fall obliquely with the attendant noise and danger of breakage, or binding on the spindle, but will be cushioned by the air beneath as it falls smoothly into place.

Splined to the boss 81a of the standard 80a is an arm 112, below the baseplate 10 and above the bell crank 108. A link 113 extends from the pivot pin 114 on the free end of the arm to a boss 115, Fig. 5, projecting downwardly from the standard 80 through an elongated opening 116 in the baseplate. The lever arm of the boss 115 about the pivot at 81 and the lower arm of the pin 114 about the boss 81a extend in the same direction and are parallel and of equal length, and thus the placing of the post 70, by the operator, at either of its two operating positions or at its clearance position, causes the post 71, through the linkage 112—115, to assume a corresponding position diametrically opposite it.

It is desirable, of course, for most efficient operation, that the stack supporting units 73 have the relationship with the edge of the record for which they are designed regardless of the diameter of the record or of the swinging of the units about the pivots 81 and 81a. This condition is assumed if the angle A, Fig. 4, between the crank 90 and a line L drawn from the center of the shaft 72 to the turntable center, is preserved in shifting from one operating position to the other. To this end the point 93 at which the link 92 from the crank pivots on the bell crank 108 is so chosen as to be equi-distant from the two operating positions of the point 91, shown in full and broken lines in Fig. 4. This same geometrical relationship exists between the crank 90 of the post 70 and its respective bell crank 95 as has just been described in connection with the post 71 and bell crank 108.

In Fig. 11 the supporting unit is shown as it normally appears at its two operating positions. For clarity of the illustration the unit has been represented as stationary and the smaller sized record R1 has been moved toward it, instead of vice versa. It will be seen that the supporting unit stands in exactly the same relationship to the edge of both large and small records, R and R1, respectively.

Due to the angularity of the arms 94 and 107 with respect to a line between the shafts 72 and their respective pivots 81 and 81a, the cranks 90 will not be pulled through as great an angle at their inner position as at their outer positions. This, however, is of no moment, since once the record has been dropped, continued rotation of the stack supporting units is ample to introduce a sufficiently firm support beneath the stack, as previously described, and illustrated in Fig. 12, where the ultimate position of the unit, when operating with smaller records R1, is shown in broken lines.

To cover what would otherwise be unsightly holes in the base plate 10, flat, integral wings 117 and 118 are formed on the standard 80 to lie above the opening 116 and wings 119 and 120 are formed on both standards 80 and 80a to lie above the openings 84.

Coming now to the mechanism above the baseplate 10 which initiates the power take-off to produce the movements previously described, it will be seen that the spindle 23 for the rubber-tired wheel 22 is embraced by a cam slot 131 in a rocker arm 130. At its right hand end 132, as viewed in Figs. 1 and 2, this slot is concentric about the rocker arm pivot 133 and movement from the position shown in Fig. 2 in a counter-clockwise direction will thus move the wheel 22 outwardly against the turntable rim 21, as seen in Fig. 1, from which the wheel will derive the power to drive the shaft 25 by means of the speed reduction unit 24, as previously described.

Figure 8:
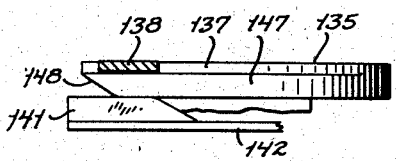
Fig. 8 is a section taken on the line 8—8 of Fig. 7.

The counter-clockwise movement of the arm 130 is derived from the turntable spindle. The block 16, previously mentioned as keyed to the spindle, pivotally carries at 134 a cam plate 135 which normally rests on a rubber bumper 136 on the block at a point remote from the pivot 134. The upper surface of the plate 135 is formed, as at 137, as a cam. The plate revolves with the turntable sprindle and in its normal lower position passes beneath a cam follower 138 formed on the rocker arm 130. The cammed, upstanding flange 141 of an arm of a bell crank 142, pivoted on the base plate at 143, is normally held out of engagement with the cam plate 135 by means of a latch 144. When this latch is tripped, however, by means later described, the bell crank is rotated clockwise against the stop 145 by means of a spring 146. If the cam plate 135, at this time, is revolving past the flange 141 the flange will simply ride along its concentric outer edge 147 until it passes and the bell crank will then continue on to its stop 145. The flange 141 now projects into the path of the cam plate, the lower surface of which is bevelled as at 148, Fig. 8, and will therefore, at its next approach, ride up onto the flange. The parts are at this time in the position shown in Figs. 7 and 8 and the cam 137 has been raised to engage the cam follower 138. Continued rotation forces the cam follower outwardly, rocking the arm 130 to move the wheel 22 against the rim. Near the end of its travel, the rocker arm engages a pin 149 on the bell crank 142 which is thereby rocked counter-clockwise sufficiently to be re-engaged by the latch 144, when the tripping means is later withdrawn, and the flange 141 is thus returned to idle position.

As the rocker arm 130 engages the wheel and rim, a lug 150 on the arm is caught by a latch 151 on an arm 152, Fig. 1. This arm is drivingly mounted on a rockshaft 153 journalled in the base plate. Also drivingly mounted on the rockshaft, below the base plate, is a cam follower 154. The disc 104, previously mentioned as carrying the roller pin 103, has formed on its periphery a single cam tooth 155. After the shaft 25 has been rotated to produce the tone arm movements and record changing, this tooth engages the follower 154, camming it outwardly against a spring 156. The latch 151 thus releases the lug 150 which is then caught by a second latch 157. During the attendant slight movement of the rocker arm 130, the wheel 22 is still held in driving engagement because of the concentric lull 132 in the cam slot. Further driving of the shaft 25 releases the follower from the cam tooth 155 and the spring 156 returns the arm 152 against its bumper 158. The lug 150 is thereby released from the latch 157 and the rocker arm is swung to its idle position of Fig. 2, by the spring 140, and the wheel is withdrawn from the rim 21.

The tripping of the latch 144 initiates all the movements and operations so far described, excepting the manual adjustments, and is accomplished by the tone arm upon its arrival at a point, near the spindle, to which it has been swung by the playing groove G and its continuation as a run-in groove G2, Fig. 13. Secured to the hollow tone arm shaft 35 is a depending bell-shaped skirt 170 concealing the bearing of the shaft. Projecting laterally from this skirt and thus swinging with the tone arm 40 is an arm 171 pivotally carrying, at its free end, a rod 172 which extends beneath the turntable rim and adjacent the latch 144. A latch tripping finger 173, adjustably secured to the free end of the rod, is adapted to engage an upstanding ear 174 on the latch member, thus tripping it when the rod is pulled far enough by the arm 171. The rod 172 is yieldably and slidably held against a knife-edge 175, also on the latch member, by a light leaf spring 176, mounted on an upstanding ear on the base plate, and is slidably supported by the horizontal surface 177. The rod is provided, near its free end, with a series of latch teeth 178 which may be formed by circumferential grooves as seen in Fig. 3. As the needle and tone arm approach the conclusion of the playing groove these teeth reach the knife-edge 175 and slide over it one by one, due to the complementary bevels of the teeth and knife-edge. Any reverse movement, except as later explained, of the tone arm from then on will cause the rod 172 to reverse its direction and the knife-edge will be moved by the radial surface of a tooth to rock the latch member 144, about its pivot 179 and against the sping 180, in tripping direction.

The latch can thus be tripped by the tone arm in two different ways. A record having a run-in groove G2 will swing the tone arm far enough to engage the finger 173 and latch ear 174. A record without a run-in groove will allow the tone arm to travel to and fro after the needle leaves the playing groove and at its first reverse swing the knife-edge will be moved as just described.

The ear 174 is set slightly oblique to the path of the finger 173 and the end of the finger has a corresponding bevel 181. On engagement, therefore, the finger is urged to the right, Figs. 1 and 2, and pressure of the teeth on the knife-edge is relieved.

As stated, reverse movement of the tone arm trips the latch by means of the teeth 178. Therefore, during the swinging out of the tone arm by means of the power take-off, the rod 172 is held away from the knife-edge 175 by a pin 182 carried by the rocker arm 130, as seen in Fig. 1.

Figure 14:
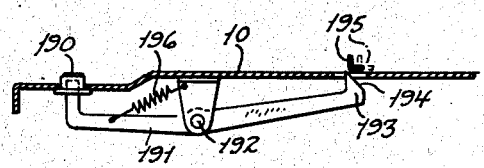
Fig. 14 is a section taken on the line 14—14 of Fig. 1.

A further means of tripping the latch is furnished by the manual starting button 190, projecting upwardly through an opening in the base plate and attached to a rocker arm 191 pivoted at 192 beneath the baseplate Figs. 1 and 14. At its other end the arm 191 is bent upwardly at 193 to pass through a second opening in the baseplate. Then the button 190 is pressed downwardly, a beveled surface 194 on the end 193 of the latch member 144 and cams it in the tripping direction. The rocker arm is normally held out of engagement by a spring 196.

The various elements of the mechanism having been described, a complete cycle of operation will now be briefly explained to coordinate their various functions. The records to be played having been chosen, the posts 70 and 71 are placed in the proper position, by means of the handle 86 and indicia 88—89, to accommodate the size of records being used. The records are then stacked upon the spindle so as to rest upon the posts. The motor is started by means of a switch 200 at the front of the base plate, the tone arm being swung aside.

Three different conditions may prevail at the start, as follows: The power take-off may be engaged from previous operation of the machine and the mechanism may have previously passed the record dropping operation in its cycle; the power take-off may be engaged and record dropping not yet reached; or the power take-off may be disengaged.

In the first case, the tone arm will be brought inwardly and lowered at what would ordinarily be the starting groove of a record. None being present, however, the arm remains where it is with the needle suspended beyond the rim of the turntable, which is of smaller diameter than the records. The operator presses the starting button 190 and the power take-off goes through its next cycle, this time dropping the bottom record from the stack onto the turntable, and the tone arm again swings inwardly and now engages the record.

In the second case, the record is dropped at once and the tone arm swings to engage it. The operator may have pressed the starting button, as a matter of usual procedure, but this is superfluous in this case and does nothing but rock the latch member 144, the bell crank 142 being held by contact of the rocker arm 130 with the pin 149.

In the third case, pressing the starting button engages the power take-off and the mechanism goes through its cycle, dropping the record and engaging it with the tone arm.

The record is now being played. Near the conclusion the tone arm has been swung inwardly far enough for the teeth 178 to engage the knife-edge and at the conclusion the needle leaves the playing groove, either to meander freely or to follow the run-in groove. In the first case the latch 144 is tripped by the teeth 178 and in the second by the finger 173. The arm 142 then swings into the path of the revolving cam plate 135, lifting it into engagement with the rocker arm 130 which is thereby swung to engage the power take-off at the turntable rim and is latched in this position by the arm 152. The tone arm is now raised from the record by the rocker arm 42 and is swung aside by the cam follower 48. The pin 103 engages the rocker arm 100 and causes the linkages below the base plate to rotate the stack supports 73 to drop the second record. The cam follower 60 now engages the appropriate cam 49 or 50 and returns the tone arm to the starting groove, to which it is lowered by the rocker arm 42 and rod 41, and which it is now free again to follow. The cam tooth 155 trips the latch arm 152 and disengages the power take-off.

The second record is now being played, and subsequent ones follow in the same manner until the stack is exhausted. After that the record supports 73 rotate idly and the tone arm returns to repeat the last record until the motor switch is finally opened. The supporting posts 70 and 71 are then moved outwardly and the accumulated records may be removed from the turntable.

Having thus described my invention in a single embodiment, I am aware that numerous and extensive departures may be made from the embodiment herein illustrated and described, but without departing from the spirit and scope of my invention.

I claim:

1. In an automatic gramophone, the combination with a turntable comprising an annular flange, means for rotating said turntable comprising a motor and a turntable shaft interconnecting said motor and turntable, a player arm, means for supporting a stack of records above the turntable, and means for supplying said records one by one to said turntable, means including a rotatable cam mechanism and members actuated thereby through an operative period of rotation thereof for moving the player arm clear of the record after it is played, for actuating said record supplying means, and for moving said player arm to initial playing position, driving means for said cam mechanism including a friction wheel and gearing connecting said friction wheel to the cam mechanism, a shiftable support for said wheel adapted for reciprocal movement to move the periphery of said friction wheel into and out of engagement with said turntable flange, and mechanism for controlling the reciprocal movements of said friction wheel support comprising a rotatable element connected with and rotatable with said turntable shaft, and means comprising linkage adapted for operative association with said rotatable element to communicate motion from said rotatable element to said friction wheel support, said linkage comprising a shiftable element operative when moved by said rotatable element to shift said wheel support from a normal position in which said friction wheel is maintained out of contact with said turntable flange, to an operative position in which said friction wheel engages said flange to effect rotation of said wheel and thereby rotation of said cam shaft through said gearing, a latch for retaining said lever in fully operated position wherein said friction wheel is held against said flange, a tripping means movable by said cam mechanism near the end of a complete rotation of said cam mechanism by said cam shaft for tripping said latch to release said shiftable element, retractive means for restoring said shiftable element to its said normal position responsive to tripping of said latch by said tripping means, and controlling means operable responsive to lateral movement of said player arm at the end of its playing movement to operatively associate said shiftable element with said rotatable element to cause it to shift said shiftable element to move said friction wheel to its said operative position to initiate rotation of said cam mechanism.

2. In an automatic gramophone, the combination substantially as set forth in claim 1, characterized by said shiftable element being a lever and said rotatable element having a camming surface adapted for engagement by said lever, and said controlling means comprising mechanism for relatively displacing one of said elements with respect to the other to cause the cam surface of said rotatable element to be engaged with and to move said lever in such a direction as to cause it to shift said wheel support to its recited operative position.

3. In an automatic gramophone, the combination substantially as set forth in claim 1, characterized by said shiftable element being a lever and said rotatable element having a camming surface adapted for engagement by said lever, and said controlling means comprising mechanism for relatively displacing one of said elements with respect to the other to cause the cam surface of said rotatable element to be engaged with and to move said lever in such a direction as to cause it to shift said wheel support to its recited operative position, and said controlling means also comprising a pair of movable levers, a first one of said levers being a latching lever for the second lever and engageable therewith to prevent movement of said second lever to an operative position wherein said second lever relatively moves one of said elements to relatively position said elements in the recited operative engagement of the shiftable element with the cam surface of the rotatable element, link means for moving said latching lever to inoperative position wherein said latch lever releases the latching restraint previously effected thereby on said second lever, retractive means for said levers, said link means engaged by a portion thereof with an element of said playing arm and engageable with said latching lever by a relatively remote portion when said link means is moved an amount as predetermined by movement of said playing arm past a record playing position of said arm, to move said latch lever to a position to disable its latching engagement with said second lever, and spring means to effect continued movement of both said levers after the latching engagement between said levers is disabled.

4. In an automatic gramophone, the combination substantially as set forth in claim 1, characterized by said controlling means comprising a pair of movable levers, a primary one of said levers movable to relatively so position said shiftable element and said rotatable element as to effect a camming engagement between the camming surface of the rotatable element and said shiftable element, the secondary one of said levers normally interlocked with said primary lever to restrain said primary lever from such movement, and spring means normally exerting force on said primary and secondary levers tending to move them from said relatively interlocked engagement, and link means secured at one end to an element of said player arm and movable therewith, and elsewhere engageable by a relatively remote portion with said secondary lever, adaptable when said player arm has further moved beyond record playing position to so move said secondary lever as to disable the latching of said primary lever by said secondary lever upon said further movement of said player arm.

5. In an automatic gramophone, the combination substantially as set forth in claim 1, characterized by said controlling means comprising a pair of movable levers, a primary one of said levers movable to relatively so position said shiftable element and said rotatable element as to effect a camming engagement between the camming surface of the rotatable element and said shiftable element, the secondary one of said levers normally interlocked with said primary lever to restrain said primary lever from such movement, and spring means normally exerting force on said primary and secondary levers tending to move them from said relatively interlocked engagement, and link means secured at one end to an element of said player arm and movable therewith, and elsewhere engageable by a relatively remote portion with said secondary lever, adaptable when said player arm has further moved beyond record playing position to so move said secondary lever as to disable the latching of said primary lever by said secondary lever upon said slight further movement of the player arm in the playing direction of movement thereof, and said secondary lever and said remote portion of said link means comprising additive contacting surfaces relatively so disposed as to alternately move said secondary lever in the same latch disabling direction upon a slight movement of said player arm in the reverse to the playing direction of movement thereof.

6. In an automatic gramophone, the combination substantially as set forth in claim 1, characterized by said controlling means comprising a pair of movable levers, a primary one of said levers movable to relatively so position said shiftable element and said rotatable element as to effect a camming engagement between the camming surface of the rotatable element and said shiftable element, the secondary one of said levers normally interlocked with said primary lever to restrain said primary lever from such movement, and spring means normally exerting force on said primary and secondary levers tending to move them from said relatively interlocked engagement, and link means secured at one end to an element of said player arm and movable therewith, and elsewhere engageable by a relatively remote portion with said secondary lever, adaptable when said player arm has further moved beyond record playing position to so move said secondary lever as to disable the latching of said primary lever by said secondary lever upon said further movement of said player arm, and means for restoring said primary lever to its normal position against the power of said spring means, comprising elements of said shiftable element and said primary lever adapted for interengagement to cause said shiftable element to move said primary lever when said shiftable element is operatively moved by said rotatable cam element, and means comprising interengaging portions of said primary and secondary levers adapted upon restoring movement of said primary lever, to restore said secondary lever to normal relatively interlocked engagement with said primary lever.

7. In an automatic gramophone, the combination substantially as set forth in claim 1, characterized by said controlling means comprising a pair of movable levers, a primary one of said levers movable to relatively so position said shiftable element and said rotatable element as to effect a camming engagement between the camming surface of the rotatable element and said shiftable element, the secondary one of said levers normally interlocked with said primary lever to restrain said primary lever from such movement, and spring means normally exerting force on said primary and secondary levers tending to move them from said relatively interlocked engagement, and link means secured at one end to an element of said player arm and movable therewith, and elsewhere engageable by a relatively remote portion with said secondary lever, adaptable when said player arm has further moved beyond record playing position to so move said secondary lever as to disable the latching of said primary lever by said secondary lever upon said slight further movement of the player arm in the playing direction of movement thereof, and said secondary lever and said remote portion of said link means comprising additive contacting surfaces relatively so disposed as to alternately move said secondary lever in the same latch disabling direction upon a slight movement of said player arm in the reverse to the playing direction of movement thereof, and means for restoring said primary lever to its normal position against the power of said spring means, comprising elements of said shiftable element and said primary lever adapted for interengagement to cause said shiftable element to move said primary lever when said shiftable element is operatively moved by said rotatable cam element, and means comprising inter-engaging portions of said primary and secondary levers adapted upon restoring movement of said primary lever, to restore said secondary lever to normal relatively interlocked engagement with said primary lever.

8. In an automatic gramophone, in combination, a turntable comprising an annular flange, a cam mechanism, a friction wheel adapted to cooperate with the inner surface of said flange to be driven thereby, drive means operatively connecting said friction wheel to the cam mechanism, said cam mechanism having camming engagement with means carried by a player arm, a movable lever, said movable lever operatively associated with the said friction wheel, cam means rotatable with the turntable, and linkage operable under the joint control of said player arm and said cam means for actuating said movable lever to move said friction wheel into contact with said turntable, rotating the same and driving the cam means rotatable therewith, latch mechanism to retain said friction wheel in driving contact relation with said turntable flange, said latch mechanism adapted to have locking engagement with said movable lever and restoring means for said lever comprising an element of said cam mechanism operable to disable said latch mechanism near the end of a complete rotation of the cam mechanism, and a spring biasing said lever to normal inoperative position.

9. In an automatic gramophone, in combination, a turntable comprising an annular flange, a cam mechanism, a friction wheel adapted to cooperate with said flange to be driven thereby, drive means operatively connecting said friction wheel to the cam mechanism, said cam mechanism having camming engagement with means carried by a player arm, a movable element, said movable element operatively associated with said friction wheel, cam means rotatable with the turntable, and linkage operable under the joint control of a player arm and said cam means for actuating said movable element to move the friction wheel into contact with the said turntable, latch mechanism engageable with said movable element to retain said wheel in driving contact relation with said turntable flange, and restoring means for said movable element comprising an element of said cam mechanism operable to disable said latch mechanism near the end of a complete rotation of the cam mechanism, and a spring biasing said movable element moving said friction wheel into and out of contact with said turntable flange solely by camming engagement between surfaces of said movable element and an element of support for said friction wheel.

LEE B. GREEN.